United States Patent
Makaran

(10) Patent No.: US 6,960,895 B2
(45) Date of Patent: Nov. 1, 2005

(54) COUPLED RFI CHOKE AS STALL DETECTION MEANS FOR BRUSH TYPE DC MOTOR

(75) Inventor: John E. Makaran, London (CA)

(73) Assignee: Siemens VDO Automotive Inc., Chatham (CA)

( * ) Notice: Subject to any disclaimer, the term of this patent is extended or adjusted under 35 U.S.C. 154(b) by 15 days.

(21) Appl. No.: 10/803,567

(22) Filed: Mar. 18, 2004

(65) Prior Publication Data

US 2004/0183489 A1 Sep. 23, 2004

Related U.S. Application Data

(60) Provisional application No. 60/455,884, filed on Mar. 20, 2003.

(51) Int. Cl.$^7$ ................................................ H02K 11/02
(52) U.S. Cl. ........................ 318/245; 318/434; 318/461; 388/903
(58) Field of Search ................................ 318/244–246, 318/250, 434, 461–464, 474, 623, 629, 702; 388/903

(56) References Cited

U.S. PATENT DOCUMENTS

| | | | | |
|---|---|---|---|---|
| 3,560,818 A | * | 2/1971 | Amato | ........................ 318/138 |
| 3,727,133 A | * | 4/1973 | Marvin et al. | ............... 324/772 |
| 3,930,191 A | * | 12/1975 | Loderer | ....................... 318/376 |
| 4,270,164 A | * | 5/1981 | Wyman et al. | .......... 363/56.03 |
| 4,514,670 A | * | 4/1985 | Fassel et al. | ................. 318/467 |
| 5,132,602 A | | 7/1992 | Jorgensen et al. | .......... 318/608 |
| 5,744,921 A | | 4/1998 | Makaran | |

FOREIGN PATENT DOCUMENTS

| | | |
|---|---|---|
| EP | 0 336 530 A2 | 10/1989 |
| EP | 1 286 236 A2 | 2/2003 |

OTHER PUBLICATIONS

"The Radio Armateur's Handbook", American Radio Relay League, Newington, CONN., 1974, p. 115 shows filter circuits for dc power sources.*

* cited by examiner

*Primary Examiner*—Bentsu Ro

(57) ABSTRACT

A brush type DC motor 10 having an armature 15 and positive and negative power leads is provided. The motor includes an RFI choke 12 as a transformer in series with at least one of the positive and negative power leads to amplify current such that rotation of the armature 15 can be detected based on monitoring a voltage relating to the amplified current. Conditioning circuitry 14 is constructed and arranged to condition the voltage for detecting rotation of the armature.

19 Claims, 3 Drawing Sheets

COUPLED RFI CHOKE AS STALL DETECTION MEANS FOR BRUSH TYPE DC MOTOR

This application is based on U.S. Provisional Application No. 60/455,884, filed on Mar. 20, 2003 and claims the benefit thereof for priority purposes.

BACKGROUND OF THE INVENTION

In the realm brush type motor drives, there exists a need to detect whether or not a locked rotor condition exists in order to prevent the occurrence of thermal events. There exist many possible means of achieving this, including variable reluctance coils placed between the magnets in the stator, Hall effect sensors used to detect shaft rotation, as well as the use of current sensors. However, the use of discrete feedback sensors in the motor may adversely affect the size, cost, complexity, power consumption and, particularly with Hall effect sensors, reliability of the motor.

Thus, there is a need to detect armature rotation and/or current in a brush type DC motor by using existing components within the motor, with minor modifications, as an armature rotation sensor.

SUMMARY OF THE INVENTION

An object of the invention is to fulfill the need referred to above. In accordance with the principles of the present invention, this objective is achieved by providing a method of detecting rotation of an armature of a brush-type DC motor having positive and negative power leads. The method provides an RFI choke as a transformer in series with at least one of the power leads of the motor to amplify current, and the rotation of the armature is detected based on monitoring a voltage relating to the amplified current.

In accordance with another aspect of the invention, a brush type DC motor having positive and negative power leads is provided. The motor includes an RFI choke as a transformer in series with at least one of the positive and negative power leads to amplify current. Control circuitry is constructed and arranged to control a function of the motor based on the amplified current.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
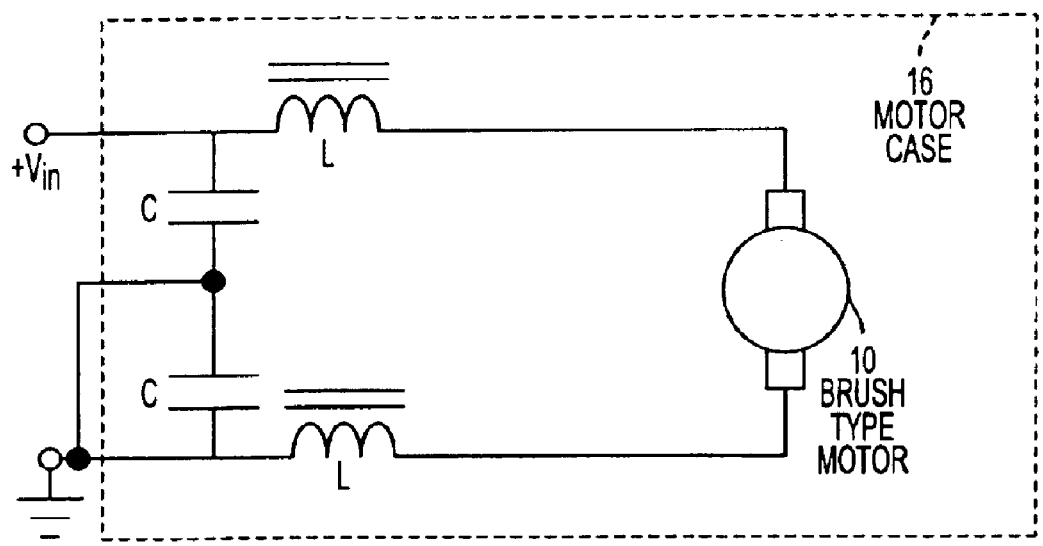
FIG. 1 is a schematic illustration of radio frequency interference (RFI) filtering for a conventional brush type motor.

In most, if not all brush type DC motor applications used in automotive applications, there exists a need to suppress conducted radio frequency interference (RFI) emissions. Typically, as the conducted emissions in a brush type DC motor are both differential and common mode in nature, first order LC filters are placed in series with both the positive and negative power leads. Each LC filter includes the conventional capacitor C connected in parallel across the power leads and an inductor L connected in series with the power leads. This conventional arrangement is shown in FIG. 1 for a typical brush-type DC motor 10.

During the process of commutation, there can exist changes in current due to the change in impedance seen by the motor windings. Due to the magnitude of the impedances involved, this "commutation ripple" measured as a voltage can be very small, however, the current change can be amplified to provide a reliable means of armature rotation detection.

Figure 2:
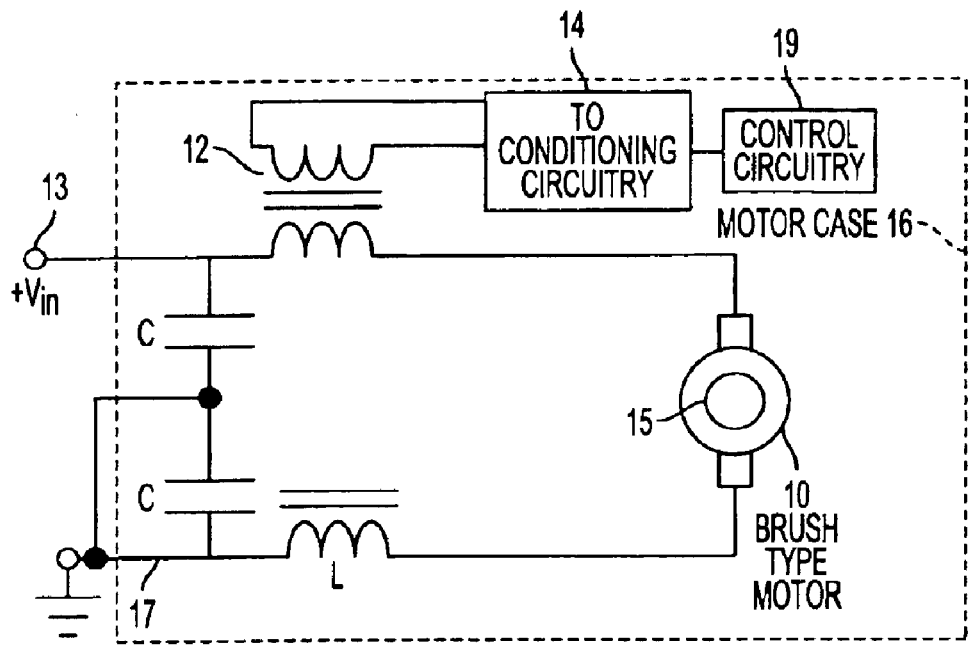
FIG. 2 is a schematic illustration showing the use of a single RFI choke as a transformer in series with a positive power lead of a motor to detect motor rotation in accordance with the principles of the invention.

In accordance with the principles of the invention, the amplification can be provided through the use of a conventional RFI choke 12 as a transformer in series with at least the positive power lead 13 of the conventional brush-type DC motor 10. This arrangement is shown in FIG. 2. Thus, the RFI choke 12 is used instead of the conventional inductor L in series with at least one of the power leads. The conventional capacitor C remains across the power leads. The advantage of using this type of configuration to detect rotation of the armature 15 of the motor 10 is that no ripple voltage will exist on the secondary of the transformer 12 if the motor armature 15 (rotor) is stationary. In addition, the number of turns on the secondary of the transformer can be varied to obtain the desired degree of amplification. As shown in FIG. 2, the LC filter remains in series with the negative lead 17.

The voltage to be conditioned (e.g., voltage relating to the amplified current due to the use of the RFI choke) can be fed directly into standard conditioning circuitry 14 that preferably includes, for example, blocks for signal conditioning, and stall detection. The conditioning circuitry is connected with control circuitry 19 for controlling, e.g., disabling of the motor in the event of a blocked rotor or stall condition. The control circuitry 19 can include, but is not limited to, a relay, a Pulse Width Modulated (PWM) controller, a DC/DC converter, analog control means or a microprocessor. Thus, the voltage can be monitored to detect rotation of the armature 15 or the amplified current can be monitored, to provide a control function for the motor. For example, if a blocked rotor condition occurs, the motor can be disabled. Hence, a PMW controller can disable the motor if the conditioned voltage is determined to be too high, a relay can be disabled, an analog PWM control chip can be disabled, or the amplified current or conditioned voltage of the RFI choke 12 can be read by a microprocessor.

Figure 3:
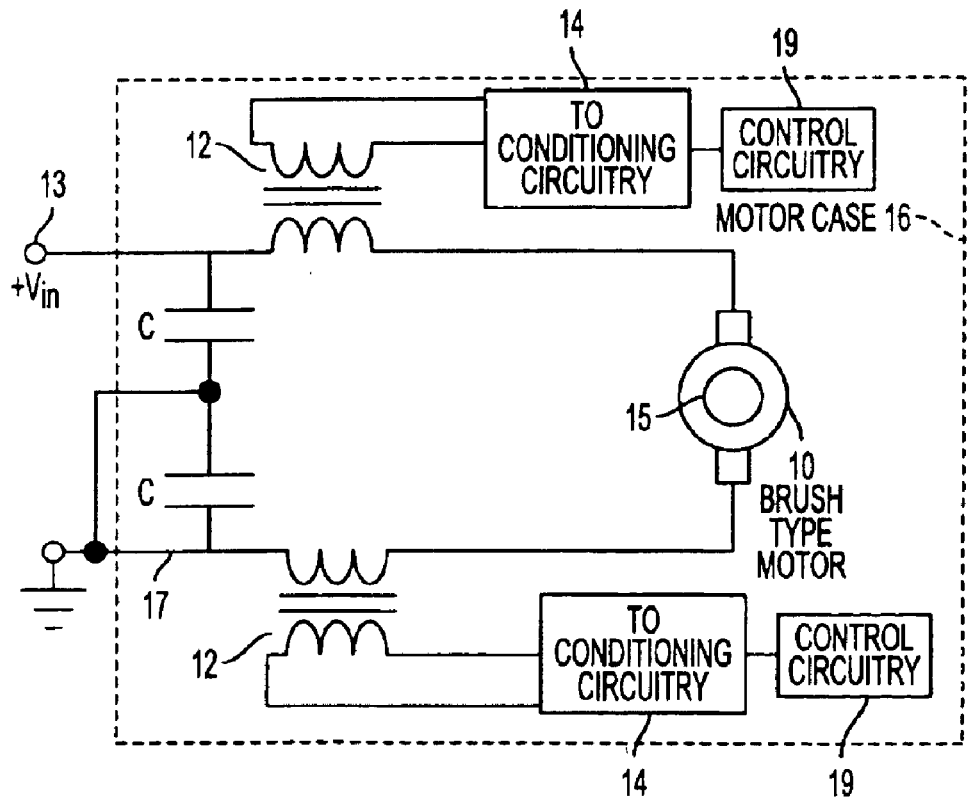
FIG. 3 is a schematic illustration showing the use of a single RFI choke as a transformer to detect motor rotation in each of the power leads of a motor in accordance with a second embodiment of the invention.
Figure 4:
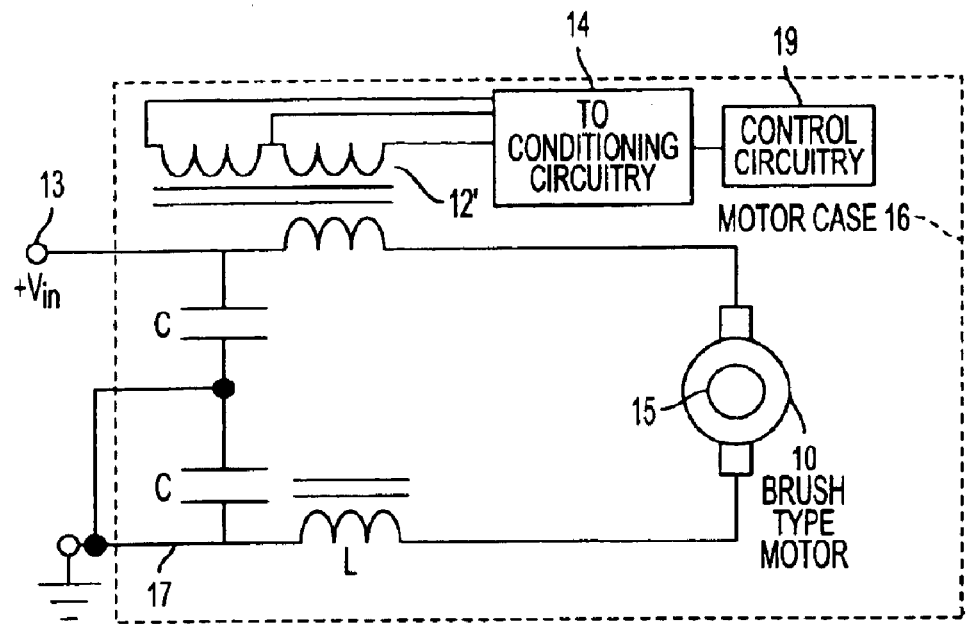
FIG. 4 is a schematic illustration showing the use of a coupled RFI choke as a transformer in series with a positive power lead of a motor to detect motor rotation in accordance with another embodiment of the invention.
Figure 5:
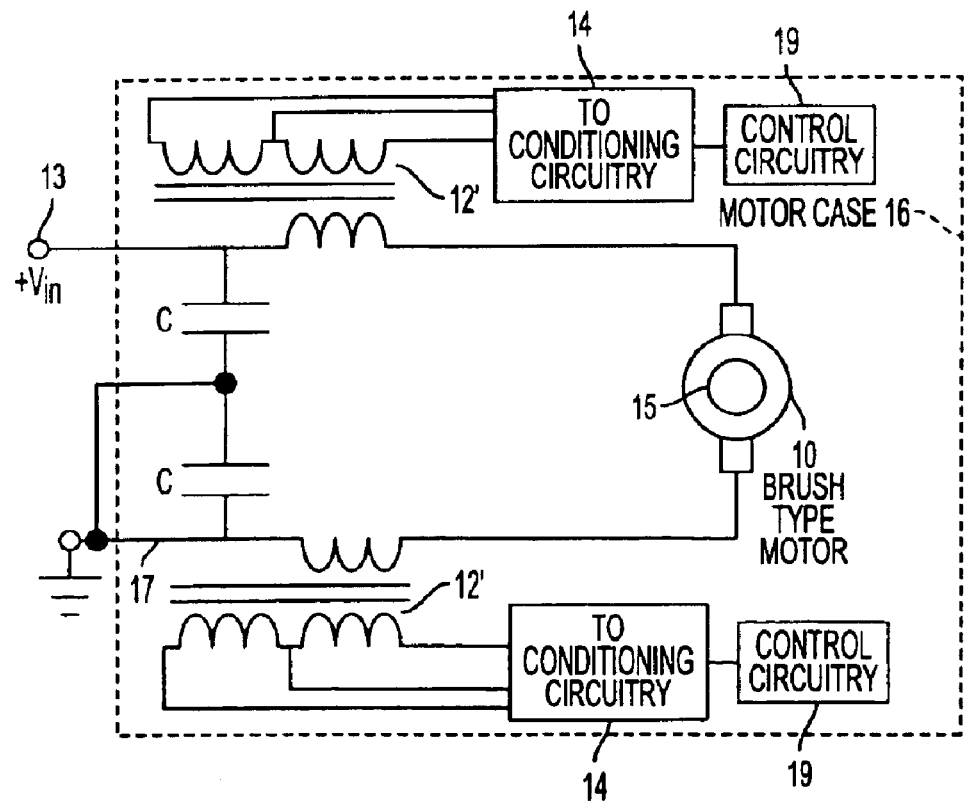
FIG. 5 is a schematic illustration showing the use of a coupled RFI choke as a transformer to detect motor rotation in each of the power leads of a motor in accordance with another embodiment of the invention.

The RFI choke 12 can be placed in the negative lead of the motor, or in both leads (FIG. 3) to obtain the desired degree of sensitivity. In addition, instead of providing a single RFI choke, a coupled RFI choke 12' can be placed in series with a positive power lead of a motor (FIG. 4) or with each of the leads (FIG. 5). Alternatively, a single RFI choke can be placed in the positive lead with a coupled RFI choke placed in the negative lead.

In the illustrated embodiment, the RFI choke(s) 12, conditioning circuitry 14, and control circuitry 19 are provided within the motor case 16. The motor case 16 is an enclosure in which motor windings, brushes, etc., are housed. It can be appreciated that the RFI chokes 12 and/or the conditioning and control circuitry can be located outside of the motor case 16.

Thus, an existing component (RFI choke as a transformer) is used to detect armature rotation or current in a brush type-DC motor in a cost-effective manner.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. Detection structure for detecting rotation of an armature of a brush-type DC motor having positive and negative power leads, the detection structure comprising:
   an RFI choke as a transformer in series with at least one of the positive and negative power leads of the motor to amplify current such that rotation of the armature can be detected based on monitoring a voltage relating to the amplified current, and control circuitry constructed and arranged to control a function of the motor based on detecting rotation of the armature,
   wherein an RFI choke is provided in series with each of the negative and positive power leads, with a capacitor associated with each choke provided across the power leads.

2. The detection structure of claim 1, wherein the control circuitry is constructed and arranged to stop operation of the motor when a stall condition of the motor is determined.

3. A brush type DC motor having positive and negative power leads, the motor including:
   an RFI choke as a transformer in series with at least one of the positive and negative power leads to amplify current, and
   control circuitry constructed and arranged to control a function of the motor based on the amplified current,
   wherein an RFI choke is provided in series with each of the negative and positive power leads with a capacitor associated with each choke provided across the power leads.

4. The motor of claim 3, wherein the control circuitry is constructed and arranged to stop operation of the motor when a stall condition of the motor is determined.

5. Detection structure for detecting rotation of an armature of a brush-type DC motor having positive and negative power leads, the detection structure comprising:
   an RFI choke as a transformer in series with at least one of the positive and negative power leads of the motor to amplify current such that rotation of the armature can be detected based on monitoring a voltage relating to the amplified current, and
   control circuitry constructed and arranged to control a function of the motor based on detecting rotation of the armature,
   wherein the RFI choke is provided together with a capacitor in communication with one of the power leads, and an LC filter is provided in series with the other power lead.

6. The detection structure of claim 5, wherein the RFI choke is in communication with a positive power lead of the motor and a LC filter is in communication with a negative power lead of the motor.

7. The detection structure of claim 5, wherein the control circuitry is constructed and arranged to stop operation of the motor when a stall condition of the motor is determined.

8. A brush type DC motor having positive and negative power leads, the motor including:
   an RFI choke as a transformer in series with at least one of the positive and negative power leads to amplify current, and
   control circuitry constructed, and arranged to control a function of the motor based on the amplified current,
   wherein the RFI choke is provided together with a capacitor in communication with one of the power leads, and an LC filter is provided in series with the other power lead.

9. The motor of claim 8, wherein the control circuitry is constructed and arranged to stop operation of the motor when a stall condition of the motor is determined.

10. A method of detecting rotation of an armature of a brush-type DC motor having positive and negative power leads, the method includes:
    providing an RFI choke as a transformer in series with at least one of the power leads of the motor to amplify current,
    detecting rotation of the armature based on monitoring a voltage relating to the amplified current, and
    further providing the RFI choke together with a capacitor in communication with one of the power leads, and providing an LC filter in series with the other power lead.

11. The method of claim 10, further including feeding the voltage to conditioning circuitry.

12. The method of claim 11, further including stopping operation of the motor when a blocked rotor condition is detected by the conditioning circuitry based on the monitored voltage.

13. A method of detecting rotation of an armature of a brush-type DC motor having positive and negative power leads, the method includes:
    providing an RFI choke as a transformer in series with at least one of the power leads of the motor to amplify current,
    detecting rotation of the armature based on monitoring a voltage relating to the amplified current, and
    further providing an RFI choke in series with each power leads of the motor and a capacitor associated with each choke disposed across the power leads.

14. The method of claim 13, further including feeding the voltage to conditioning circuitry.

15. The method of claim 14, further including stopping operation of the motor when a blocked rotor condition is detected by the conditioning circuitry based on the monitored voltage.

16. A method of controlling a brush-type DC motor having positive and negative power leads, the method includes:
    providing an RFI choke as a transformer in series with at least one of the power leads of the motor to amplify current, controlling a function of the motor based on the amplified current, and further providing the RFI choke together with a capacitor in communication with one of the power leads, and providing an LC filter in series with the other power lead.

17. The method of claim 16, wherein the controlling step includes stopping operation of the motor.

18. A method of controlling a brush-type DC motor having positive and negative power leads, the method includes:

providing an RFI choke as a transformer in series with at least one of the power leads of the motor to amplify current, controlling a function of the motor based on the amplified current, and further providing an RFI choke in series with each power leads of the motor and a capacitor associated with each choke disposed across the power leads.

19. The method of claim 18, wherein the controlling step includes stopping operation of the motor.

* * * * *